United States Patent [19]

Speer et al.

[11] Patent Number: 4,525,152
[45] Date of Patent: Jun. 25, 1985

[54] BELT TENSIONER AND METHOD OF MAKING THE SAME

[75] Inventors: Billy L. Speer, Wilson "B" Township, Greene County; Lee R. Burris, Porter Township, Greene County; Jerry W. Rogers, Wilson "A" Township, Greene County, all of Mo.

[73] Assignee: Dayco Corporation, Dayton, Ohio

[21] Appl. No.: 402,404

[22] Filed: Jul. 27, 1982

[51] Int. Cl.³ .............................................. F16H 7/12
[52] U.S. Cl. .................................... 474/133; 474/135; 267/140.4
[58] Field of Search ................................ 474/133–135, 474/138, 109; 29/452; 267/140.4

[56] References Cited

U.S. PATENT DOCUMENTS

| Re. 30,842 | 1/1982 | Speer | 474/135 |
| 3,442,147 | 5/1969 | Downey | 474/117 |
| 4,144,772 | 3/1979 | Brackin et al. | 474/135 |
| 4,285,676 | 8/1981 | Kraft | 474/135 |

Primary Examiner—James A. Leppink
Assistant Examiner—Frank H. McKenzie, Jr.
Attorney, Agent, or Firm—Joseph V. Tassone

[57] ABSTRACT

A tensioner for a power transmission belt or the like that is adapted to be operated in an endless path and a method of making the same are provided, the tensioner comprising a support unit for being fixed relative to the belt, a belt engaging unit carried by the support unit and being movable relative thereto, a polymeric spring unit being operatively associated with the support unit and the belt engaging unit for urging the belt engaging unit relative to the support unit and against the belt with a force to tension the belt, and a coiled mechanical spring also being operatively associated with the support unit and the belt engaging unit for urging the belt engaging unit relative to the support unit and against the belt with a force to tension the belt whereby the polymeric spring unit and the mechanical spring combine to define the tensioning force for the belt while the polymeric spring unit additionally tends to dampen the movement of the belt engaging unit relative to the support unit, the mechanical spring being substantially completely embedded in the polymeric spring unit so that the mechanical spring is substantially completely engaged and surrounded by the polymeric spring unit.

10 Claims, 9 Drawing Figures

BELT TENSIONER AND METHOD OF MAKING THE SAME

BACKGROUND OF THE INVENTION

1. Field of the Invention

This invention relates to an improved tensioner for an endless power transmission belt or the like and to a method of making such a tensioner or the like.

2. Prior Art Statement

It is known to provide a tensioner for a power transmission belt or the like that is adapted to be operated in an endless path, the tensioner comprising support means for being fixed relative to the belt, a belt engaging means carried by the support means and being movable relative thereto, and polymeric spring means being operatively associated with the support means and the belt engaging means for urging the belt engaging means relative to the support means and against the belt with a force to tension the belt. For example, see the United States patent to Speer, U.S. Pat. No. Re. 30,842.

It is also known to provide a tensioner for a power transmission belt or the like that is adapted to be operated in an endless path, the tensioner comprising a support means for being fixed relative to the belt, a belt engaging means carried by the support means and being movable relative thereto, and mechanical spring means being operatively associated with the support means and the belt engaging means for urging the belt engaging means relative to the support means and against the belt with a force to tension the belt. For example, see the United States patent to Downey, U.S. Pat. No. 3,442,147.

It is also known from the published German patent application, No. 2,902,182, that a coiled mechanical spring means is also operatively associated with the support means and the belt engaging means for urging the belt engaging means relative to the support means and against the belt with a force to tension the belt whereby the polymeric spring means and the mechanical spring means combine to define the tensioning force for the belt while the polymeric spring means additionally tends to dampen the movement of the belt engaging means relative to the support means.

SUMMARY OF THE INVENTION

It is one feature of this invention to provide an improved tensioner for a power transmission belt or the like.

In particular, it is believed according to the teachings of this invention that when utilizing a polymeric spring means for urging the belt engaging means of a belt tensioner relative to a support means thereof and against a belt with a force to tension the belt, a mechanical spring means can also be operatively associated with the support means and the belt engaging means to combine its urging force with the force of the polymeric spring means to define the tensioning force for the belt while the polymeric spring means will additionally tend to dampen the movement of the belt engaging means relative to the support means.

For example, one embodiment of this invention provides a tensioner for a power transmission belt or the like that is adapted to be operated in an endless path, the tensioner comprising a support means for being fixed relative to the belt, a belt engaging means carried by the support means and being movable relative thereto, polymeric spring means being operatively associated with the support means and the belt engaging means for urging the belt engaging means relative to the support means and against the belt with a force to tension the belt, and coiled mechanical spring means also being operatively associated with the support means and the belt engaging means for urging the belt engaging means relative to the support means and against the belt with a force to tension the belt whereby the polymeric spring means and the mechanical spring means combine to define the tensioning force for the belt while the polymeric spring means additionally tends to dampen the movement of the belt engaging means relative to the support means. The mechanical spring means is substantially completely embedded in the polymeric spring means so that the mechanical spring means is substantially completely engaged and surrounded by the polymeric spring means.

Accordingly, it is an object of this invention to provide an improved tensioner for a power transmission belt or the like that is adapted to be operated in an endless path, the tensioner of this invention having one or more of the novel features of this invention as set forth above or hereinafter shown or described.

Another object of this invention is to provide an improved method of making a tensioner for a power transmission belt or the like that is adapted to be operated in an endless path, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
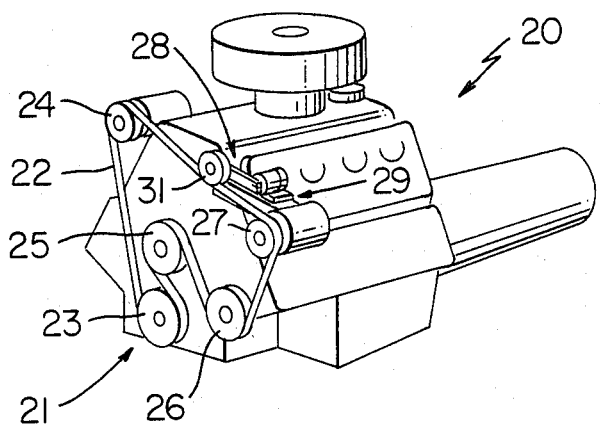
FIG. 1 is a perspective view illustrating a typical endless power transmission belt drive system being utilized on an internal combustion engine with such belt drive system using one embodiment of the belt tensioner of this invention.

While the various features of this invention are hereinafter illustrated and described as providing a tensioner for a particular power transmission belt of a particular motor vehicle engine, it is to be understood that the various features of this invention can be utilized singly or in any combination thereof to provide a tensioner for other arrangements as desired.

Therefore, this invention is not to be limited to only the embodiments illustrated in the drawings, because the drawings are merely utilized to illustrate one of the wide variety of uses of this invention.

Referring now to FIG. 1, an automobile internal combustion engine is generally indicated by the reference numeral 20 and utilizes an endless power transmission belt drive system that is generally indicated by the reference numeral 21 and comprises a single endless power transmission belt 22 and a plurality of five belt pulleys or sheaves 23, 24, 25, 26 and 27, the sheave 23 comprising a drive sheave and the sheaves 24–27 comprising driven sheaves which are suitably operatively connected to associated assemblies or accessories to drive such accessories in a manner well known in the art. The belt drive system 21 includes a belt tensioner of this invention that is generally indicated by the reference numeral 28.

Since the belt tensioner 28 of this invention is substantially the same as the belt tensioner fully disclosed and claimed in the aforementioned U.S. patent to Speer, U.S. Pat. No. Re. 30,842, this patent is being incorporated into this disclosure by this reference thereto whereby only the details of the tensioner 28 that are believed necessary to understand the features of this invention will be set forth.

Figure 2:
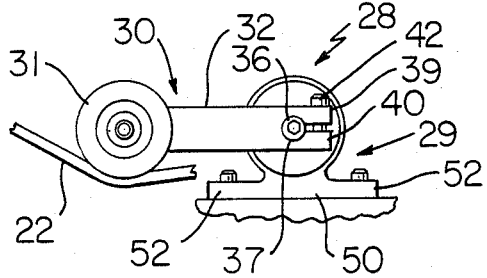
FIG. 2 is a fragmentary, enlarged front view of the belt tensioner of FIG. 1.
Figure 4:
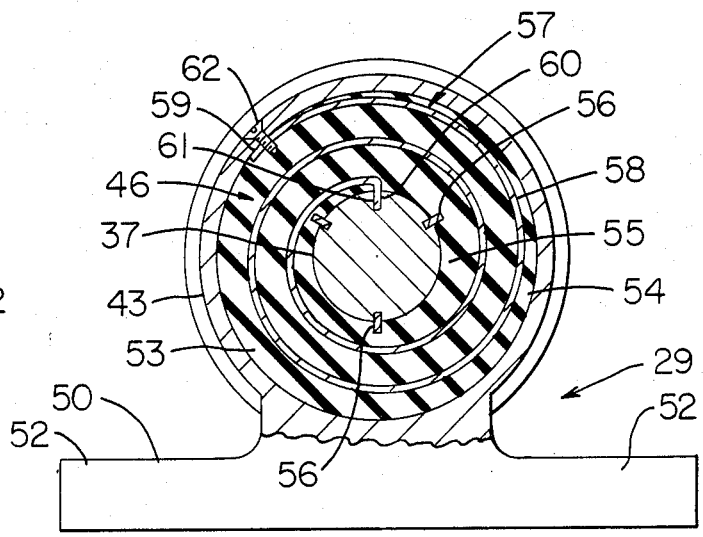
FIG. 4 is a cross-sectional view taken substantially on line 4—4 of FIG. 3.
Figure 3:
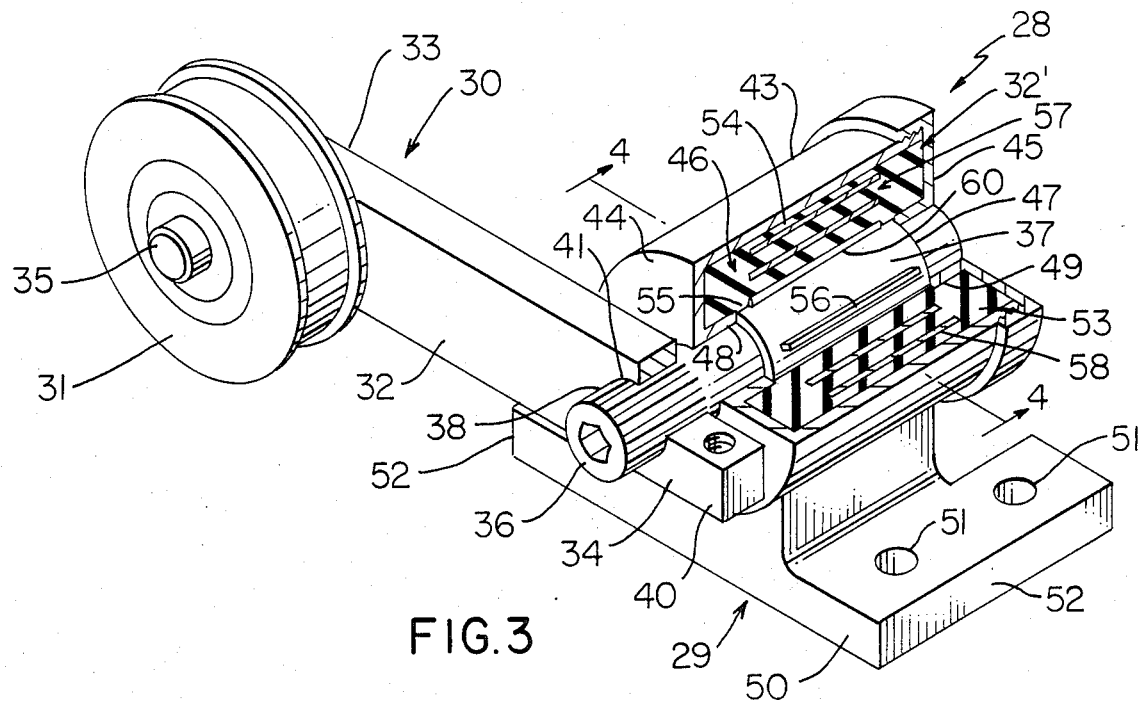
FIG. 3 is an enlarged, perspective view of the belt tensioner of FIGS. 1 and 2, FIG. 3 being partially cut away.

In particular, it can be seen in FIGS. 2–4 that the belt tensioner 28 of this invention comprises a support means that is generally indicated by the reference numeral 29 and that is adapted to be fixed to the engine 20, the tensioner 28 also including a belt engaging means that is generally indicated by the reference numeral 30 and that includes a conventional idler pulley 31 for engaging against the belt 22 as illustrated in FIGS. 1 and 2 to be rotated thereby and be urged in a counterclockwise direction in FIG. 2 to place a tensioning force on the belt 22 by a polymeric spring means that is generally indicated by the reference numeral 32' and that is operatively interconnected to the support means 29 and belt engaging means 30 in a manner hereinafter set forth.

The belt engaging means 30 of the tensioner 28 includes a lever or arm 32 having opposed ends 33 and 34, the idler pulley 31 being rotatably mounted on the end 33 of the lever 32 by a pivot shaft 35 in a manner well known in the art while the end 34 of the lever 32 is fixed to an end 36 of a shaft-like member 37 whereby the shaft-like member 37 comprises part of the belt engaging means 30 as will be apparent hereinafter.

While the lever 32 can be secured to the end 36 of the shaft 37 in any suitable manner, it can be seen that the end 36 of the shaft 37 is suitably splined or knurled at 38 and the end 34 of the lever 32 is bifurcated to define opposing sections 39 and 40 as illustrated in FIG. 2 and are suitably cut away at 41 to accept the end 36 of the shaft 37 therebetween. A fastening member 42 interconnects the sections 39 and 40 together and a tightening of the fastening member 42 in a manner well known in the art will cause the sections 39 and 40 to be drawn toward each other and thereby suitably grip the sections 39 and 40 to the knurled section 38 of the shaft 37 to prevent movement therebetween. In this manner, the position of the lever 32 on the shaft 37 can be adjusted by merely loosening the fastening member 42 for a purpose hereinafter set forth.

The support means 29 includes a substantially cylindrical housing portion 43 that has opposed end wall means 44 and 45 carried thereby and defining an annular chamber 46 therein and in which a portion 47 of the shaft 37 is substantially concentrically disposed and rotatably mounted, the end walls 44 and 45 having cylindrical inner flanges 48 and 49 rotatably supporting the portion 47 of the shaft 37 as illustrated with the end wall 45 being removable from the housing 43 such as through a telescoping threaded relation therewith as illustrated.

The support means 29 includes a mounting flange member 50 formed integrally and one-piece with the housing means 43 as illustrated or formed separately therefrom and secured thereto in any suitable manner. In any event, the flange means 50 has suitable openings 51 formed through a pair of legs 52 thereof for bolting the support means 29 directly to the engine 20 or any other suitable support structure so that the support means 29 and, thus, the housing means 43 will be held stationary while the belt engaging means 30 is adapted to be movable relative thereto as will be apparent hereinafter.

The polymeric spring means 32' comprises a mass 53 of any suitable polymeric material having been cast in the annular chamber 46 of the housing means 43 in a manner well known in the art to respectively have opposite ends 54 and 55 (that define inner and outer peripheral surfaces thereof) respectively secured to the housing means 43 and to the shaft portion 47 through the adhesive properties of the material 53 and/or through the use of any suitable adhesive means if desired. In this manner, the polymeric spring means 32' is operatively interconnected to the support means 29 and belt engaging means 30.

While the shaft portion 47 has a plurality of radially disposed and longitudinally extending vanes or fins 56 extending into the mass 53 of polymeric material for the reasons set forth in the aforementioned U.S. Pat. No. Re. 30,842, it is to be understood that the vanes 56 could be eliminated if desired.

The belt tensioner 28 so far described comprises structure that is substantially identical to the structure disclosed in the aforementioned U.S. Pat. No. Re. 30,842.

However, it is believed according to the teachings of this invention that if a mechanical spring means is also operatively interconnected to the support means 29 and the belt engaging means 30 of the tensioner 28 previously described so that the mechanical spring means will also tend to urge the belt engaging means 30 relative to the support means 29 and against the belt 22 with a force to tension the belt 22 the force of the polymeric spring means 32' and the force of the mechanical spring means will be combined to define the tensioning force for the belt 22 while the polymeric material 53 will additionally tend to dampen movement of the belt engaging means 30 relative to the support means 29 and thereby dampen oscillations of the belt 22.

In particular, in the embodiment of the tensioner 28 of this invention illustrated in FIGS. 1–4, such a mechanical spring means is generally indicated by the reference numeral 57 in FIGS. 3 and 4 and comprises a metallic torsion spring member 58 disposed in a coiled manner so as to have opposite ends 59 and 60, the inner end 60 being operatively interconnected to the portion 47 of the shaft 37 by being received in a longitudinal slot 61 thereof while the other outer end 59 of the spring member 58 is fastened to the housing means 43, such as by the threaded fastening member 62 illustrated in FIG. 4.

The mechanical spring means 57 as illustrated in FIGS. 3 and 4 is completely embedded in the polymeric spring means 32 by having been initially interconnected to the shaft 37 and housing 43 before the mass of polymeric material 53 is cast therein so that when the polymeric material 53 is subsequently cast in the annular chamber 46 through the removed end wall 45, the polymeric material 53 completely encases or embeds the mechanical spring member 58 therein for a purpose hereinafter described.

However, it is to be understood that the various features of this invention can provide a tensioner where the mechanical spring means is only partially embedded in the polymeric spring means or can provide a tensioner wherein the mechanical spring means is completely separate from the polymeric spring means as long as the mechanical spring means and the polymeric spring means are operatively interconnected to the support means and to the belt engaging means for the purpose hereinafter described.

From the above, it can be seen that it is a relatively simple method of this invention to form the belt tensioner 28 of this invention that is adapted to operate in the manner now to be described.

Before or after the support means 29 has been suitably bolted to the engine 20 through the mounting flanges 52 in the manner previously described, the lever arm 32 is adjusted on the shaft 37 so that when the lever arm 32 is fastened by the member 42 to prevent movement thereof relative to the shaft 37, in the manner previously described, the lever 32 is in such a position that the same must be rotated in a clockwise direction in order to place the pulley 31 thereof against the belt 22 as illustrated in FIGS. 1 and 2, such rotation of the arm 32 causing the polymeric spring means 32' and the mechanical spring means 57 to be placed under torsion so that both the polymeric spring means 32' and the torsion spring 58 are continuously tending to rotate the belt engaging means 30 in a counterclockwise direction in FIGS. 1-4 in order to place a tensioning force onto the belt 22 in substantially all operating conditions of the belt 22 for the reasons fully set forth in the aforementioned U.S. Pat. No. Re. 30,842.

However, it is believed that during any oscillations of the belt 22 and, thus, any oscillations of the belt engaging means 30, the polymeric material 53 will act as a dampening means to the resulting force being imposed against the spring member 58 during such oscillations of the belt 22 so as to tend to restrict the magnitude of the oscillations of the belt engaging means 30 and, thus, thereby dampen the oscillations of the belt 22 in a manner that cannot be achieved when the polymeric spring means 32' is utilized by itself to provide the tensioning force for the tensioner or when the mechanical spring means 57 is utilized by itself to provide the tensioning force for the tensioner.

In particular, it was believed that the use of polymeric materials for the polymeric spring means 32' in the aforementioned U.S. Pat. No. Re. 30,842 was limited to the tear strength of the polymeric material whereby it is believed that by utilizing the mechanical spring means in combination with such polymeric spring means according to the teachings of this invention, the mechanical spring means will reduce the force (shear) in the polymeric material 53 which will reduce its susceptibility of tear. Thus, the mechanical spring means of this invention is believed to allow for the use of a wider variety of polymeric materials to be used in the tensioning device as the polymeric spring means thereof and that such will provide a wider range of tensioning forces and dampening factors.

Thus, it can be seen that it is believed that the polymeric material of the tensioner of this invention supplies a dampening force while both the polymeric spring means and the mechanical spring means combine to supply the required tensioning force for the belt being tensioned thereby.

In this manner, it is believed that the polymeric material provides a dampening function in a manner similar to the fluid dampening provided in the copending patent application, Ser. No. 296,694, filed Aug. 27, 1981 of Leslie B. Wilson whereby this copending patent application is being incorporated into this disclosure by this reference thereto.

While the tensioner 28 previously described has the lever arm 32 thereof fastened to the shaft 37 so that the shaft 37 forms part of the belt engaging means 30 and the housing 43 forms part of the support means 29, it is to be understood that the lever 32 could be fastened to the housing means 43 so that the housing means 43 would form part of the belt engaging means 30 and that the shaft 37 could be fastened to the engine 20 and thereby form part of the support means 29.

Figure 5:
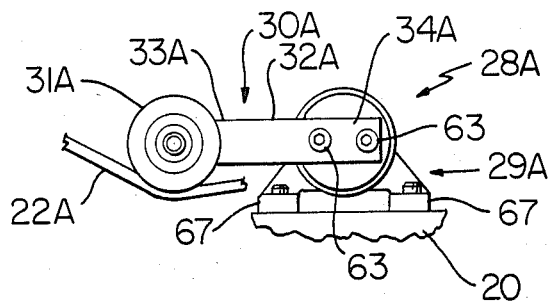
FIG. 5 is a view similar to FIG. 2 and illustrates another embodiment of the belt tensioner of this invention.
Figure 7:
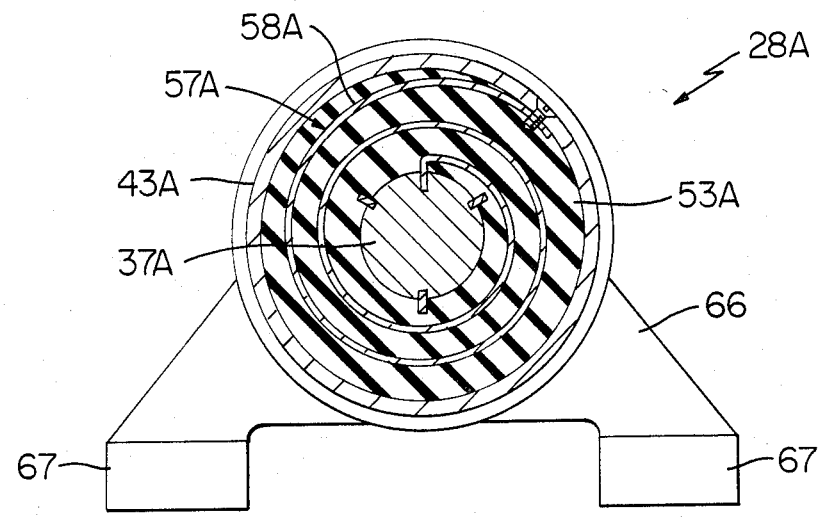
FIG. 7 is a cross-sectional view taken substantially on line 7—7 of FIG. 6.
Figure 6:
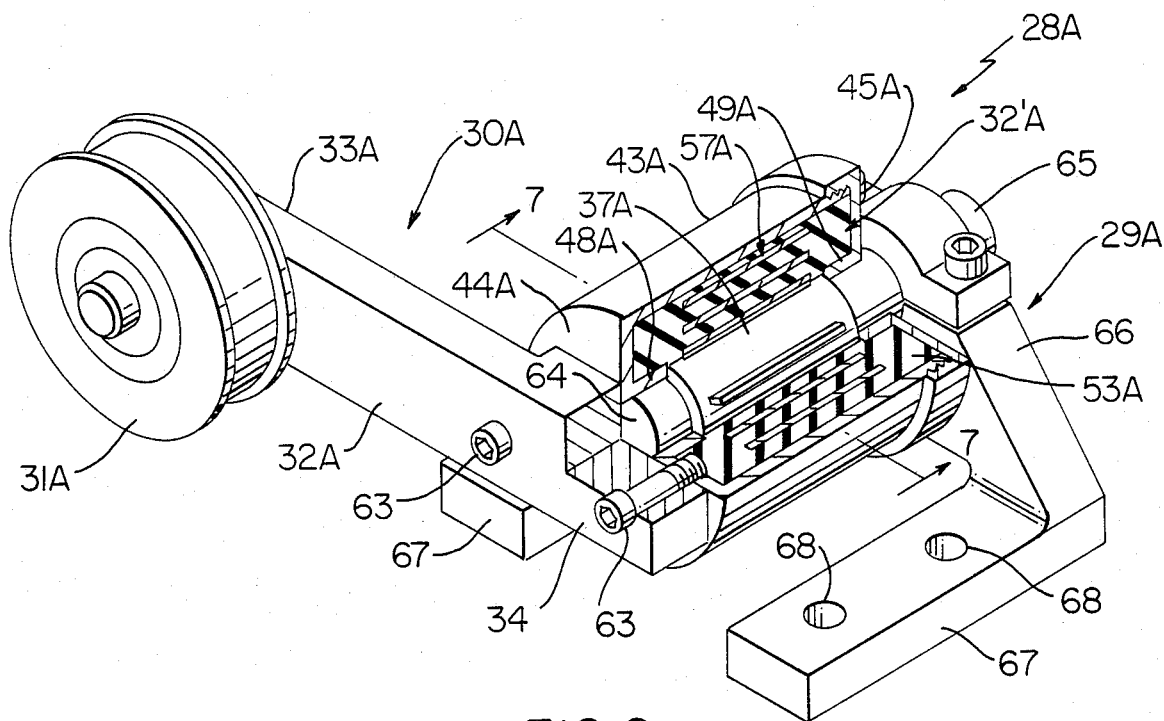
FIG. 6 is an enlarged perspective view of the belt tensioner of FIG. 5, FIG. 6 also being partially cut away.

For example, such a belt tensioner of this invention is generally indicated by the reference numeral 28A in FIGS. 5-7 and parts thereof similar to the tensioner 28 previously described are indicated by like reference numerals followed by the reference letter "A".

As illustrated in FIGS. 5-7, the lever arm 32A has its end 34A directly secured to the end plate 44A of the housing means 43A by fastening means 63 while the other end 33A thereof rotatably carries the idler pulley 31A in the manner previously described.

The shaft 37A of the tensioner 28A does not have the knurled end 38 previously described but has its end 64 disposed short of the end plate 44A of the housing means 43A while being mounted in the inner cylindrical flange 48A thereof as previously described, the other end 65 of the shaft 37A extending beyond the removable end plate 45A of the housing 43A to be fastened to a mounting bracket 66 in any suitable manner.

In this manner, the housing 43A is rotatably mounted by its cylindrical flanges 48A and 49A on the shaft 37A and since the housing 43A is directly fastened to the arm 32A by the fastening means 63, the housing means 43A becomes part of the belt engaging means 30A of the tensioner 28A while the shaft 37A comprises part of the stationary support means 29A thereof.

However, the polymeric spring means 32'A and mechanical spring means 57A are respectively operatively interconnected to the housing means 43A and the shaft 37A in the manner previously described for the tensioner 28 and thereby combine their urging forces to urge the pulley 31A against the belt 22A as illustrated in FIG. 5 for the reasons previously set forth while the polymeric spring means 32'A additionally dampens oscillating movement of the belt engaging means 30A for the reasons previously set forth.

The mounting member 66 has a pair of legs 67 which are adapted to be directly fastened to the engine 20 or any other suitable support structure by being bolted thereto through the openings 68 thereof in a manner well known in the art.

Since the tensioner 28A operates in substantially the same manner as the tensioner 28 previously described, a discussion of the operation of the tensioner 28A is deemed not necessary. However, it can readily be seen that the tensioner 28A can be made in a relatively simple manner by the method of this invention to operate in substantially the same manner as the tensioner 28 previously described.

While it can be seen that the mass of polymeric material 53 or 53A is generally in shear between the housing 43 or 43A and the shaft 37 or 37A during the operation of the tensioner 28 or 28A, the mass of material 53 or 53A is also partially under compression between the coils of the spring member 58 or 58A during oscillations of the belt engaging means 30 or 30A as the coils tend to wind together or unwind from each other as the case may be.

Nevertheless, it is believed according to the teachings of this invention that both the mechanical spring means and polymeric spring means of the tensioner of this invention could be placed under compression to provide a combined compressive force acting on the belt to tension the belt rather than a combined torsional force as previously described.

Figure 8:
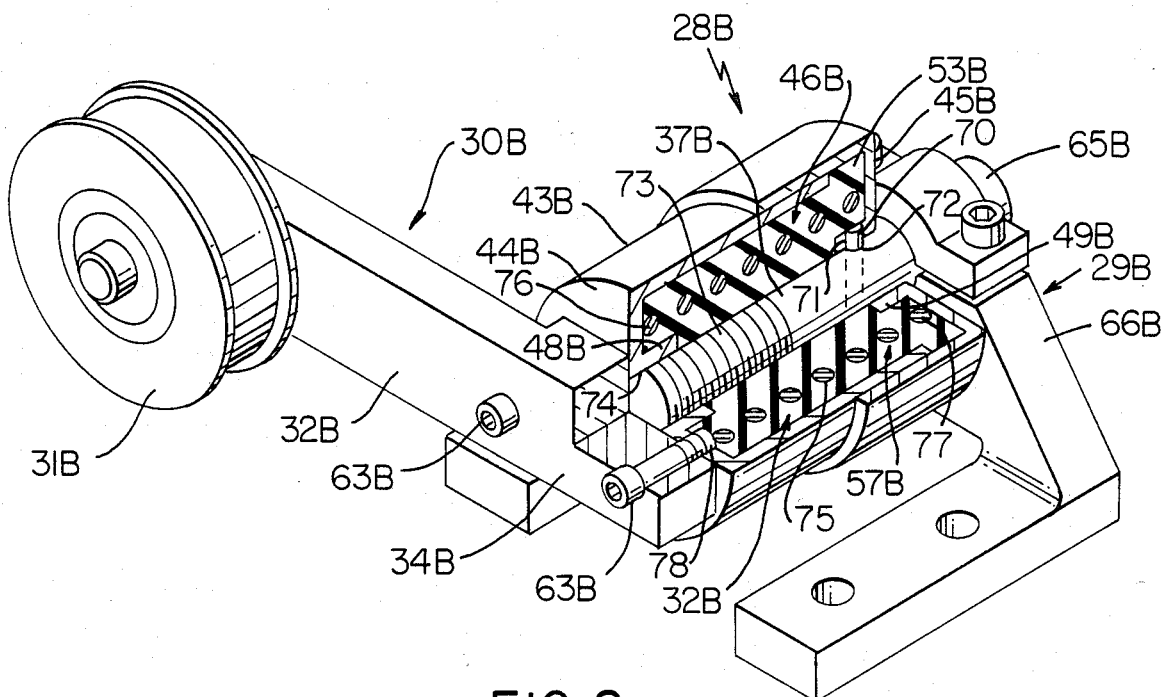
FIG. 8 is a view similar to FIG. 6 and illustrates another embodiment of the belt tensioner of this invention.
Figure 9:
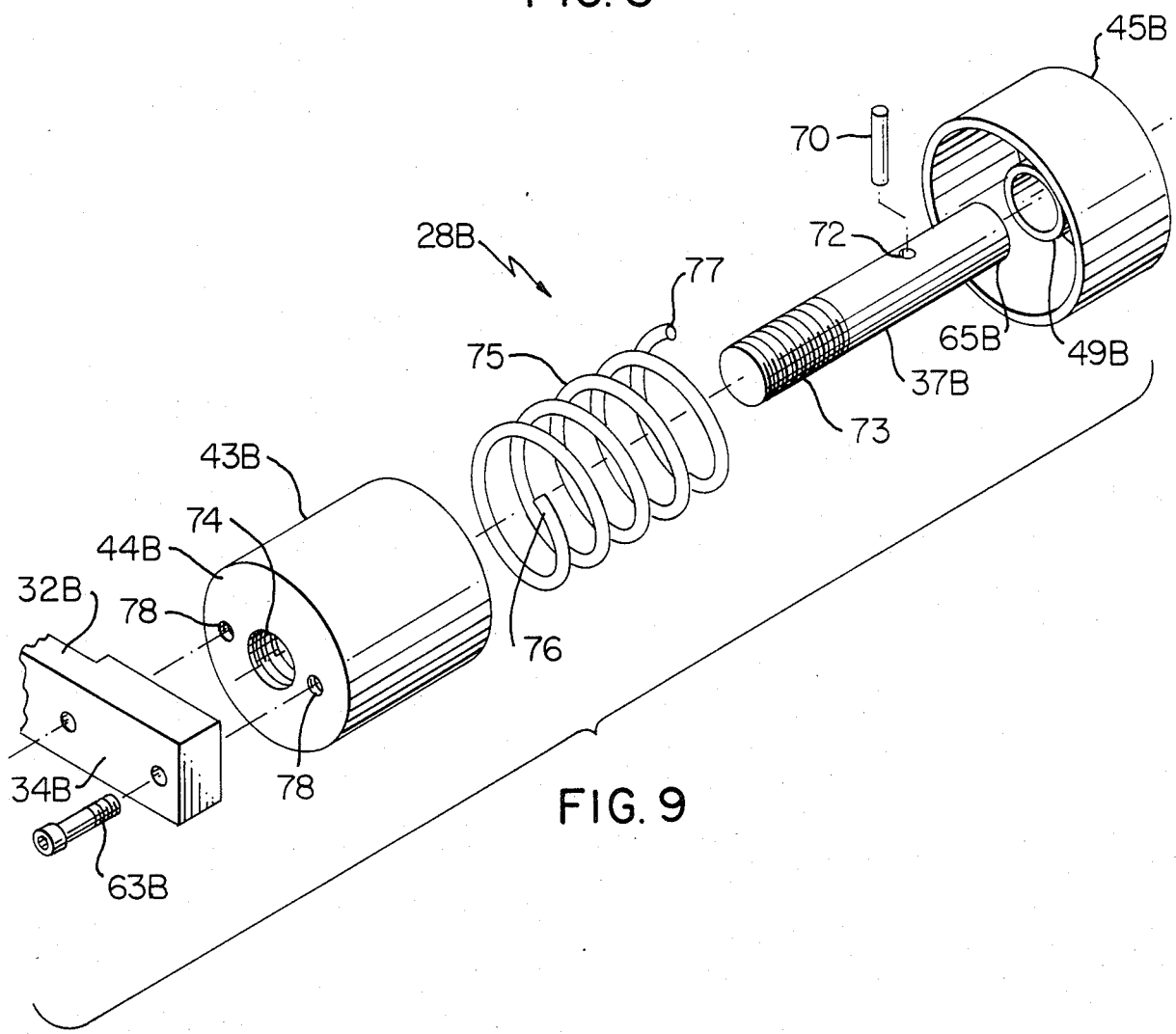
FIG. 9 is an exploded perspective view of certain of the parts of the belt tensioner of FIG. 8.

For example, reference is now made to FIGS. 8 and 9 wherein another tensioner of this invention is generally indicated by the reference numeral 28B and parts thereof similar to the tensioners 28 and 28A previously described are indicated by like reference numerals followed by the reference letter "B".

As illustrated in FIGS. 8 and 9, the lever arm 32B of the belt engaging means 30B is fastened to the end plate 44B of the housing means 43B so that the housing means 43B forms part of the belt engaging means 30B.

However, the other end plate 45B merely telescopes over the housing member 43B to permit axial relative movement therebetween as will be apparent hereinafter.

Also the end plate 45B is fastened to the shaft 37B by a pin 70 passing through an opening 71 in the internal cylindrical flange 49B of the end plate 45B as well as in an opening 72 in the shaft 37B. Thus, since the end 65B of the shaft 37B is fixed to the bracket means 66B in the manner previously set forth for the tensioner 28A, it can be seen that the shaft 37B and end plate 45B define part of the support means 29B as will be apparent hereinafter.

The shaft 37B has an externally threaded portion 73 that threadedly receives an internally threaded portion 74 of the inner cylindrical flange 48B of the end plate 44B for a purpose hereinafter described whereby clockwise movement of the lever arm 32B in FIG. 8 causes the end plate 44B to thread on the stationary shaft 37B in such a manner that the same tends to axially move the housing portion 43B toward the stationary end plate 45B and thereby reduce the distance between the end plates 44B and 45B. Conversely, movement of the lever 32B in a counterclockwise direction in FIG. 8 causes the end plate 44B to unthread on the threaded portion 73 of the shaft 37B and thereby increase the distance between the end plates 44B and 45B for a purpose hereinafter set forth.

The housing means 43B defines the chamber 46B which receives the mass 53B of polymeric material to define the polymeric spring means 32'B, the mass 53B being operatively interconnected to the end plate 44B and, thus, to the belt engaging means 30B and being operatively interconnected to the end plate 45B, and, thus, to the support means 29B.

In addition, the chamber 46B receives the mechanical spring means 57B therein which comprises a coiled compression spring 75 having opposed ends 76 and 77 thereof respectively bearing against the end plates 44B and 45B so that the compression spring 75 is initially under compression between the end plates 44B and 45B when the mass 53B of polymeric material is initially cast inside the chamber 46B, such as by being injected into the chamber 46B through a suitable opening in the end plate 44B and/or 45B, such as one or both of the openings 78 in the end plate 44B which receives the threaded fastening members 63B that secures the end 34B of the lever arm 32B to the end plate 44B. In this manner, the mechanical spring means 57B is also operatively interconnected to the end plate 44B and, thus, to the belt engaging means 30B and is operatively interconnected to the end plate 45B, and, thus, to the support means 29B.

In any event, it can be seen that once the mass of material 53B has been cast in the chamber 46B of the housing means 43B, the same fully embeds the compression spring 75 therein with the mass of material 53B and spring 75 being such that the same will normally tend to urge the end plate 44B away from the end plate 45B when the arm 32B of the belt engaging means 30B is disposed anywhere between an approximately 6 o'clock position up to a 9 o'clock position when facing the end plate 44B of the tensioner 28B.

In this manner, when the support means 29B is fastened to the engine 20, the arm 32B must be raised in a clockwise direction from the 6 o'clock position thereof in order to place the pulley 31B against the belt 22 and such clockwise movement of the arm 32B causes the end plate 44B to axially thread on the threaded portion 73 of the shaft 37B in a direction to be axially moved toward the end plate 45B and thereby place not only the compression spring 75 under further compression, but also to place the polymeric spring means 32'B under compression thereof so that the combined compressive forces of the compressed mechanical spring means 57B and polymeric spring means 32'B tend to urge the end plate 44B away from the end plate 45B and thereby cause rotational movement of the end plate 44B on the threaded portion 73 of the shaft 37B in a counterclockwise direction as illustrated in FIG. 8 so that the arm 32B tends to move the pulley 31B against the belt 22 with a tensioning force.

Thus, when an oscillation of the belt 22 causes the lever arm 32B to be moved in a clockwise direction, further compressing action takes place against the polymeric spring means 32'B and mechanical spring means 57B and when the oscillation of the arm 32B is in a counterclockwise direction, the force of the compressed polymeric spring means 32'B and mechanical spring means 57B is such to cause the belt engaging means 30B to maintain a tensioning force on the belt 22.

However, the polymeric spring means 32'B also tends to dampen movement of the coils of the compression spring 75 toward or away from each other during the oscillating movements of the arm 32B of the belt engaging means 30B so that the polymeric spring means 32'B additionally acts as a dampening means for the mechanical spring means 57B for the reasons previously described.

While each of the various embodiments of this invention has been described as having the polymeric material thereof cast about its respective mechanical spring means after the mechanical spring means has been assembled to its associated shaft in the housing that is to contain the polymeric spring means, it is to be understood that the polymeric spring means and mechanical spring means can be assembled or united together in any suitable manner prior to being assembled with their associated shaft and/or housing whereby such prior assembled polymeric spring means and mechanical spring means would comprise a self-contained subassembly that could later be assembled as a unit within the housing that is to receive the same. In this manner, the self-contained spring unit for each belt tensioner could readily be replaced or changed as desired.

Thus, it can be seen that this invention not only provides improved tensioners for power transmission belts or the like, but also this invention provides improved methods for making such tensioners or the like.

While the forms and methods of this invention now preferred have been illustrated and described as required by the Patent Statute, it is to be understood that other forms and method steps can be utilized and still fall within the scope of the appended claims.

What is claimed is:

1. In a tensioner for a power transmission belt or the like that is adapted to be operated in an endless path, said tensioner comprising a support means for being fixed relative to said belt, a belt engaging means carried by said support means and being movable relative thereto, polymeric spring means being operatively associated with said support means and said belt engaging means for urging said belt engaging means relative to said support means and against said belt with a force to tension said belt, and coiled mechanical spring means also being operatively associated with said support means and said belt engaging means for urging said belt engaging means relative to said support means and against said belt with a force to tension said belt whereby said polymeric spring means and said mechanical spring means combine to define the tensioning force for said belt while said polymeric spring means additionally tends to dampen the movement of said belt engaging means relative to said support means, the improvement wherein said mechanical spring means is substantially completely embedded in said polymeric spring means so that said mechanical spring means is substantially completely engaged and surrounded by said polymeric spring means, said mechanical spring means comprising a compression spring.

2. A tensioner as set forth in claim 1 wherein one of said belt engaging means and said support means comprises a shaft and the other of said belt engaging means and said support means comprises a housing surrounding at least part of said shaft.

3. A tensioner as set forth in claim 2 wherein said compression spring has opposite ends, one of said ends of said compression spring being operatively interconnected to said shaft, the other of said ends of said compression spring being operatively interconnected to said housing.

4. A tensioner as set forth in claim 3 wherein said polymeric spring means has opposite ends, one of said ends of said polymeric spring means being operatively interconnected to said shaft, the other of said ends of said polymeric spring means being operatively interconnected to said housing.

5. A tensioner as set forth in claim 4 wherein said compression spring is disposed in a coiled manner about said shaft and said polymeric spring means comprises a mass surrounding said shaft and extending from said shaft to said housing.

6. In a method of making a tensioner for a power transmission belt or the like that is adapted to be operated in an endless path, said method comprising the steps of providing a support means for being fixed relative to said belt, providing a belt engaging means to be carried by said support means and be movable relative thereto, operatively associating polymeric spring means with said support means and said belt engaging means for urging said belt engaging means relative to said support means and against said belt with a force to tension said belt, and operatively associating coiled mechanical spring means also with said support means and said belt engaging means for urging said belt engaging means relative to said support means and against said belt with a force to tension said belt whereby said polymeric spring means and said mechanical spring means combine to define the tensioning force for said belt while said polymeric spring means additionally tends to dampen the movement of said belt engaging means relative to said support means, the improvement comprising the steps of substantially completely embedding said mechanical spring means in said polymeric spring means so that said mechanical spring means is substantially completely engaged and surrounded by said polymeric spring means, and forming said mechanical spring means to comprise a compression spring.

7. A method of making a tensioner as set forth in claim 6 and including the step of forming one of said belt engaging means and said support means to comprise a shaft and the other of said belt engaging means and said support means to comprise a housing surrounding at least part of said shaft.

8. A method of making a tensioner as set forth in claim 7 and including the steps of forming said compression spring to have opposite ends, operatively interconnecting one of said ends of said compression spring to said shaft, and operatively interconnecting the other of said ends of said compression spring to said housing.

9. A method of making a tensioner as set forth in claim 8 and including the steps of forming said polymeric spring means to have opposite ends, operatively interconnecting one of said ends of said polymeric spring means to said shaft, and operatively interconnecting the other of said ends of said polymeric spring means to said housing.

10. A method of making a tensioner as set forth in claim 9 and including the steps of disposing said compression spring in a coiled manner about said shaft, and forming said polymeric spring means to comprise a mass surrounding said shaft and extending from said shaft to said housing.

* * * * *